United States Patent [19]
Burgie et al.

[11] Patent Number: 5,906,799
[45] Date of Patent: May 25, 1999

[54] CHLOROSILANE AND HYDROGEN REACTOR

[75] Inventors: Richard Anthony Burgie, Midland, Mich.; Eric Michael Fleming, Selkirk, Canada

[73] Assignee: Hemlock Semiconductor Corporation, Hemlock, Mich.

[21] Appl. No.: 07/891,132

[22] Filed: Jun. 1, 1992

[51] Int. Cl.[6] .............................. B01J 19/02; C04B 35/52
[52] U.S. Cl. ............................... 422/241; 501/90; 501/95
[58] Field of Search .................................. 422/240, 241; 501/95, 99, 90

[56] References Cited

U.S. PATENT DOCUMENTS

| | | | |
|---|---|---|---|
| 2,821,369 | 1/1958 | Hillard | 165/159 |
| 3,250,322 | 5/1966 | McCrary et al. | 165/133 |
| 3,391,016 | 7/1968 | McCrary et al. | 427/249 |
| 3,895,219 | 7/1975 | Richerson et al. | 219/553 |
| 3,933,985 | 1/1976 | Rodgers | 423/350 |
| 4,217,334 | 8/1980 | Weigert et al. | 423/342 |
| 4,373,006 | 2/1983 | Glasso et al. | 428/368 |
| 4,560,589 | 12/1985 | Endou et al. | 427/249 |
| 4,596,741 | 6/1986 | Endou et al. | 428/368 |
| 4,668,452 | 5/1987 | Watanabe et al. | 501/90 |
| 4,671,997 | 6/1987 | Galasso et al. | 428/408 |
| 4,710,260 | 12/1987 | Witter et al. | 156/605 |
| 4,737,348 | 4/1988 | Levin | 422/199 |
| 5,084,606 | 1/1992 | Bailey et al. | 219/270 |
| 5,126,112 | 6/1992 | Burgie | 422/241 |

OTHER PUBLICATIONS

The Condensed Chemical Dictionary; rev. by Hawley, G.G., 1971; pp. 168–169 & 426.

*Primary Examiner*—Robert Warden
*Attorney, Agent, or Firm*—William F. Boley

[57] ABSTRACT

The present invention is a reactor for the hydrogenation of chlorosilanes at temperatures above about 600° C. The reactor comprises one or more of the following improvements: (1) a reaction chamber formed from a silicon carbide coated carbon fiber composite, (2) a heating element formed from a silicon carbide coated carbon fiber composite, and (3) one or more silicon nitride insulators electrically insulating the heating element.

21 Claims, 2 Drawing Sheets

CHLOROSILANE AND HYDROGEN REACTOR

BACKGROUND OF INVENTION

The present invention is a reactor for the hydrogenation of chlorosilanes. The reactor employs a reaction chamber and a heating element formed from silicon carbide coated carbon fiber composite and employs silicon nitride to electrically insulate the heating element.

In a typical process for producing hyperpure semiconductor-grade silicon, trichlorosilane gas is reduced in the presence of hydrogen and deposited onto a heated element. A significant portion of the trichlorosilane gas fed to such a process is de-hydrogenated to form by-product tetrachlorosilane. It is desirable to convert this by-product tetrachlorosilane back into trichlorosilane which can be recycled to the deposition process.

Rogers, U.S. Pat. No. 3,933,985, issued Jan. 20, 1976, describes a process for converting tetrachlorosilane to trichlorosilane. The process involves passing hydrogen and silicon tetrachloride vapors through a reaction chamber held at a temperature of between 900° C. and 1200° C.

More recently, Weigert et al., U.S. Pat. No. 4,217,334, issued Aug. 12, 1980, described an improved process for converting tetrachlorosilane to trichlorosilane. The process involved reacting trichlorosilane with hydrogen at a temperature of 600° C. to 1200° C., with a tetrachlorosilane and hydrogen mixture having a molar composition between 1:1 and 1:50 in equilibrium with trichlorosilane and hydrogen chloride, and suddenly quenching the mixture to below 300° C. The process described by Weigert et al. was conducted in a gas-tight tube constructed from carbon.

The use of carbon and carbon based materials, such as graphite, for construction of the reaction chamber for the process described by Rogers and by Weigert et al. suffers numerous shortcomings. For example, pressure differentials, high temperatures, and rapid temperature changes experienced in the reactor causes extreme thermal stress on the reactor components often resulting in the need to shut the reactor down for repairs. Furthermore, the carbon-based materials can react with the chlorosilane and hydrogen feed to form by-products, such as silicon carbide, methane, and carbon monoxide. These reactions not only cause deterioration of the reactor, but can also contribute to carbon and trace metal contamination of the desired hydrogenated chlorosilanes.

The present invention is a reactor which employs materials of construction designed to reduce these problems. The described carbon fiber composites provide high strength with good elasticity properties, thus providing greater resistance to pressure and thermal stress damage of the reactor. Furthermore, the coefficient of expansion of the carbon fiber composites can be tailored to closely match that of a silicon carbide coating. Therefore, thermal expansion of the carbon fiber composite is less likely to result in thermal fracture of a silicon carbide coating. The silicon carbide coating placed on the carbon fiber composite provides protection against the reductive processes which can cause deterioration of the reactor chamber and the heating element and contamination of the hydrogenated chlorosilanes.

Levin, U.S. Pat. No. 4,737,348, issued Apr. 12, 1988, describes a reactor in which hydrogen gas and tetrachlorosilane are reacted to form silicon at temperatures above about 1500° C. The reactor has walls formed from carbon or graphite and a silicon carbide coating is formed in situ on the walls. Levin describes the silicon carbide coating as being highly resistant to chemical decomposition. Levin does not address the problem of thermal shock associated with high temperatures and with heating and cooling of the reactor nor the potential problem of fracturing of materials due to pressure differentials.

The present invention can also use silicon nitride to electrically insulate the heating element employed to heat the reaction chamber. In the present reactor for reacting chlorosilane and hydrogen, it is not feasible to completely seal the reaction chamber to prevent leakage of the reactants. Therefore, the material used to electrically insulate the heating element can be subjected to chlorosilane and hydrogen at elevated temperatures. The inventors have found silicon nitride to be an excellent electrical insulating material with minimum deterioration under typical process conditions. Witter et al., U.S. Pat. No. 4,710,260, Dec. 1, 1987, describes a process for the hydrogen decomposition of trichlorosilane on silicon nitride particles. The silicon nitride is not considered for use as an insulating material and is reported to deteriorate significantly under the described process conditions. Therefore, somewhat surprisingly the inventors have found that silicon nitride is a suitable electrical insulating material for use in a reactor for reacting hydrogen and chlorosilane and that it does not contribute significant contamination to the hydrogenated chlorosilanes.

Therefore, it is an objective of the present invention to provide an improved reactor for the reaction of hydrogen and chlorosilanes. The reactor employs a silicon carbide coated carbon fiber composite as the material of construction for the reaction chamber and for the heating element. This material provides excellent resistance to reductive processes and high tolerance to thermal shock. The reactor can also employ silicon nitride to electrically insulate the heating element. Silicon nitride provides excellent insulating characteristics and high resistance to chemical attack by reactants present in the reactor.

SUMMARY OF INVENTION

Figure 1:
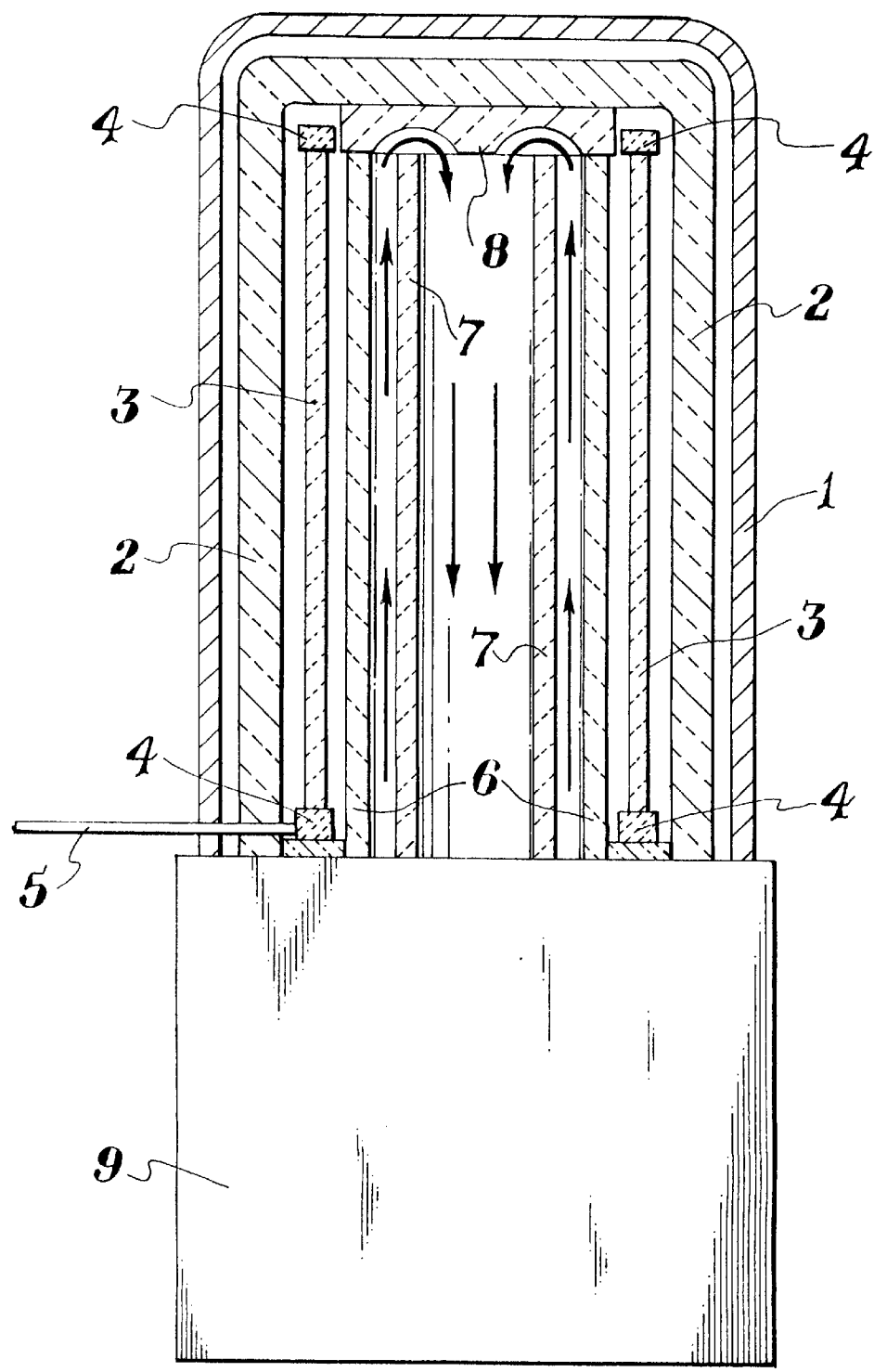
FIG. 1 is a cutaway lateral view of an embodiment of the present invention.

The present invention is a reactor for the hydrogenation of chlorosilanes. The reactor employs a reaction chamber and a heating element formed from silicon carbide coated carbon fiber composite and employs silicon nitride to electrically insulate the heating element.

Description of Invention

The present invention is a reactor for the hydrogenation of chlorosilanes at temperatures above about 600° C. The reactor comprises one or more of the following improvements: (1) a reaction chamber formed from a silicon carbide coated carbon fiber composite, (2) a heating element formed from a silicon carbide coated carbon fiber composite, and (3) one or more silicon nitride insulators electrically insulating the heating element.

As previously discussed, the hydrogenation of chlorosilanes at temperatures above about 600° C. is well known as are reactors for conducting the process. Generally, it is preferred that the process be run at temperatures within a range of 800° C. to 1200° C. to increase operating efficiencies. In order to achieve these process temperatures, the walls of the reaction chamber and heating element may be maintained at temperatures as high as 1600° C.

It is known that carbon and graphite materials can be used to form the reaction chamber for running this process and to form the heating element for heating the reaction chamber. However, at the high temperatures required, significant thermal stress is placed on the materials of construction of the reaction chamber, the heating element, and other areas of the reactor subject to high temperatures. In addition, the hydrogen and chlorosilane as well as corrosive by-products, such as hydrogen chloride, can react with the materials of construction of the reactor to cause deterioration. Thermal stress fractures and chemical deterioration of carbon and graphite materials of construction of the high temperature reactor can result in significant down time of the reactor with the accompanying loss of operating efficiencies.

The inventors have found that silicon carbide coated carbon fiber composites can be employed as materials of construction for the reaction chamber and heating element of the reactor and that the silicon carbide coated carbon fiber composites have improved resistance to pressure and thermal stress fractures and to deterioration due to reaction with feed materials and corrosive by-products.

The carbon fiber composites useful in the present invention comprise carbon fibers fixed in a matrix material, where the matrix material is stable at temperatures up to about 1600° C. The matrix material can be, for example, carbon, graphite, or silicon carbide. Preferred is when the matrix material is carbon. The carbon fiber composite can be formed by standard methods. For example when the matrix material is carbon, the carbon fibers can be impregnated by a suitable carbon source such as pitch or a resin and fixed by winding or laminating in defined directions to a desired shape or layered in a mold. This material can then be carbonized under pressure. The impregnating process and carbonizing process can be repeated until the desired density is achieved. In general, the inventors have found that carbon fiber composites with a density within a range of about 1.5 to 2.0 g/cc to be useful. The carbon fiber can be about 20 to 80 volume percent of the composite. Preferred is where the carbon fiber is about 50 to 70 volume percent of the composite.

Carbon fibers useful in the composites used in the present invention can have a density from about 1.5 to 2.0 g/cc, a Young's modulus within a range of about 200 to 600 $GN/m^2$, and tensile strength within a range of about 1500 to 8000 $N/mm^2$.

The carbon fiber composite is coated with a silicon carbide coating to protect the carbon fiber composite from deterioration due to exposure to feed materials and corrosive by-products such as hydrogen chloride. The silicon carbide coating can be applied by standard methods, for example, chemical vapor deposition using a source gas such as an organochlorosilane. A useful thickness of the silicon carbide coating is about 0.01 mm to 1.0 mm. Preferred, is a silicon carbide coating with a thickness within a range of about 0.02 mm to 0.13 mm.

In addition, the inventors have found that silicon nitride is an effective insulating material able to withstand the high temperature of the reactor and the reactive and corrosive nature of the feed materials and by-products.

Chlorosilanes which can be hydrogenated by the present process include tetrachlorosilane, trichlorosilane, dichlorosilane, and chlorosilane.

To further illustrate the present invention, reference is made to FIG. 1. FIG. 1 is a cutaway lateral view of an embodiment of the present invention. The reactor for reacting hydrogen and chlorosilanes comprises outer shell 1 composed of a stainless steel, for example, Inconel (R), Hunnington Alloy Products. The inner surface of outer shell 1 is thermally insulated from heating element 3 by thermal insulator 2. Thermal insulator 2 can be formed from standard high temperature insulating materials, for example, carbon or graphite felt and solid sheets. Preferred is when thermal insulator 2 is an insulating system similar to that described by Burgie, Pending U.S. patent application Ser. No. 07/381,228.

Figure 2:
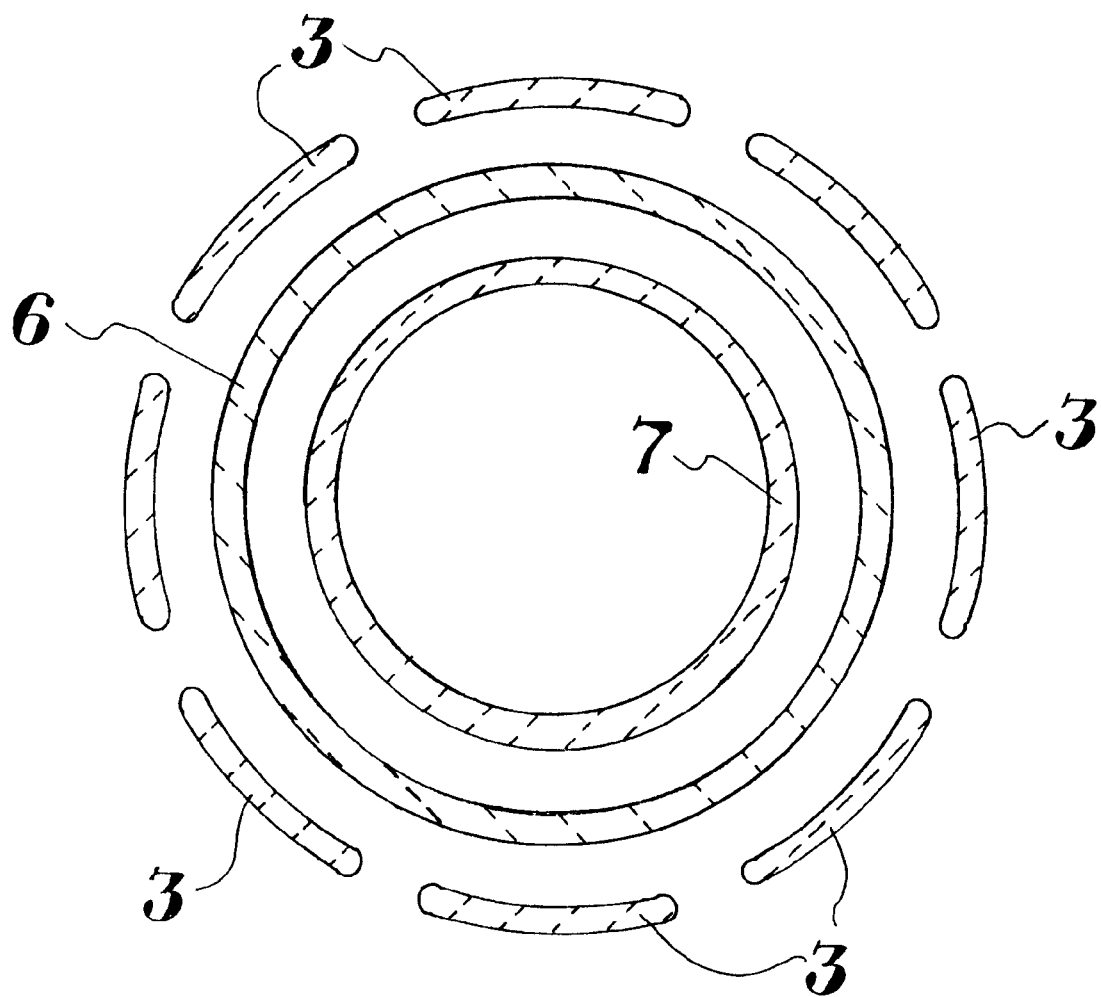
FIG. 2 is a cutaway top view of the present invention illustrating a picket-fence heating element surrounding a dual-chamber reactor.

Heating element 3 can be formed from, for example, carbon, graphite, or a silicon carbide coated carbon composite. Preferred, is when heating element 3 is formed from a silicon carbide coated carbon composite. Heating element 3 can be of standard configuration, for example, one or more rods or slats positioned around the exterior of the reaction chamber. Preferred, is when heating element 3 is of a picket-fence design similar to that illustrated in FIG. 2. Heating element 3 is electrically connected to electrode 5, which provides a means for connecting to an external energy source.

Heating element 3 is electrically insulated from the remainder of the reactor by electrical insulators 4. Electrical insulators 4 can be formed from standard high temperature and chemically resistant electrical insulating material, for example, fused silica or silicon nitride. Preferred is when electrical insulators 4 are formed from silicon nitride i.e. $Si_3N_4$. Even more preferred is when electrical insulators 4 are formed from silicon nitride particles hot-isostatic pressed to effect sintering.

Heating element 3 surrounds a reaction chamber. In FIG. 1, the reaction chamber is of a dual chamber design having an outer chamber and an inner chamber formed by two concentrically positioned tubes. The outer chamber is formed between tube 6 and tube 7. The inner chamber is formed by tube 7. The top of the reaction chamber is formed by diverter 8.

Tube 6, tube 7, and diverter 8 can be formed from standard materials for construction of high temperature reactors, for example, carbon, graphite, silicon carbide coated carbon, and silicon carbide coated graphite; or from silicon carbide coated carbon fiber composites. Preferred is when tube 6 and tube 7 are formed from a silicon carbide coated carbon fiber composite. Even more preferred is when tube 6, tube 7, and diverter 8 are formed from a silicon carbide coated carbon fiber composite.

The reactor can be connected to heat exchanger 9, wherein the hydrogen and chlorosilane fed to the reactor are preheated before passing into the outer chamber formed between tube 6 and tube 7. These gases flow through the other channel where additional heating occurs from heating element 3 and are diverted by diverter 8 to reverse flow though the inner chamber formed by tube 7. Heated gases exiting tube 7 then pass through heat exchanger 9, transferring heat to the incoming feed gases. Heat exchanger 9 can be of standard design. For example, heat exchanger 9 can be similar in design to those described by Hillard, U.S. Pat. No. 2,821,369, issued Jan. 28, 1958; McCrary et al., U.S. Pat. No. 3,250,322, issued May 10, 1966; and McCrary et al., U.S. Pat. No. 3,391,016, issued Jul. 2, 1968.

The following examples are offered to demonstrate the suitability of silicon carbide coated carbon fiber compositions and silicon nitride as materials of construction for a reactor for reacting hydrogen and chlorosilanes. These examples are not intended to limit the scope of the claims provided herein.

EXAMPLE 1

The stability of silicon nitride in a hydrogen and tetrachlorosilane environment was evaluated. The evaluation was conducted in a two-inch horizontal tube furnace. The materials to be tested were dried in the tube furnace for 72 hours under a nitrogen purge. Then, a gaseous mixture composed of 25 mole % tetrachlorosilane and 75 mole % hydrogen (TCS/$H_2$) was fed to the furnace at a rate of 464 cc/min, giving a residence time within the reactor of two to three seconds. Each material sample was exposed to the TCS/$H_2$ feed for a total of about 21 hours, with the first six hours of exposure being at a temperature of about 1150° C. and the remaining 15 hours of exposure being at a temperature of about 1350° C. During the exposure period, the exit gas from the furnace was monitored for methane and carbon monoxide by gas liquid chromatography using a flame ionization detector (GLC-FID). The results are present as parts per million, based on volume (ppmv).

The materials tested were: hot-pressed silicon nitride, Noralide NC-132/HP, Norton Company, Northboro, Mass.; reaction-bonded silicon nitride, NCX-5301, Norton Company, Northboro, Mass.; and fused silica, WYSE Glass, Bay City, Mich. The results are presented in Table 1.

TABLE 1

Stability of Silicon Nitride in a Hydrogen and Tetrachlorosilane Environment

| Material | Surface Area ($Cm^2$) | Initial Sample Wt. (g) | % Wt Loss | $CH_4$ (ppmv) | CO (ppmv) |
|---|---|---|---|---|---|
| $Si_3N_4$ (NC132/HP) | 4.50 | 26.591 | 0.131 | 26 | 12 |
| $Si_3N_4$ (NCX5301) | 1.77 | 2.653 | 0.185 | 27 | 2 |
| Fused Silica | 4.50 | 28.550 | 6.113 | 9 | 125 |

EXAMPLE 2

The stability of a silicon carbide coated carbon fiber composite in a hydrogen and tetrachlorosilane environment was evaluated. The evaluation procedure was similar to that described in Example 1. The materials tested were: a silicon carbide coated carbon fiber composite, with a fiber volume fraction of 55 to 65 percent and a bulk density of 1.6 to 1.7 g/cm$^3$, catalog No. CF222/P22, Schunk Graphite Technology, Menomonee Falls, Wis.; a non-coated carbon fiber composite, catalog No. CF212, Schunk Graphite Technology; and a non-coated carbon fiber composite, catalog No. CX-21, TTAmerica, Inc., Portland, Oreg. The results are presented in Table 2.

TABLE 2

Stability of Silicon Carbide Coated Carbon Fiber Composite in a Hydrogen and Tetrachlorosilane Environment

| Material | Surface Area ($Cm^2$) | Initial Sample Wt. (g) | % Wt Change | $CH_4$ (ppmv) | CO (ppmv) |
|---|---|---|---|---|---|
| CF222/P22 (Coated) | 9.50 | 32.092 | 0.000 | 42 | 29 |
| CF212 (Non-Coated) | 9.50 | 31.680 | +3.140 | 252 | 5 |
| CX21 (Non-Coated) | 3.80 | 9.793 | +6.281 | 104 | 8 |

The data presented in Table 2 demonstrate that minimal changes occur in the weight of the silicon carbide coated carbon fiber composite. However, the uncoated carbon fiber composites had significant increases in weight indicating the reaction of the carbon of the composite with tetrachlorosilane to form silicon carbide.

EXAMPLE 3

The stability of samples of silicon nitride was evaluated in a hydrogen and tetrachlorosilane environment for an extended period of time in a commercial reactor for hydrogenation of tetrachlorosilane. The samples to be tested were dried in a furnace for about 72 hours under a nitrogen purge and then transferred to the reactor. Feed to the reactor was a gaseous mixture comprising about 25 mole % tetrachlorosilane and 75 mole % hydrogen. Within the reactor, the samples were exposed to a temperature of about 800° C. The samples were removed from the reactor at the times indicated in Table 3 and weight loss determined. The samples were then returned to the reactor and the process continued. The results are presented in Table 3. The samples tested were $Si_3N_4$ (NC132/HP), $Si_3N_4$ (NCX5301), and fused silica (WYSE), all as previously described.

TABLE 3

Stability of Silicon Nitride in a Hydrogen and Tetrachlorosilane Environment

| | | Initial | % Wt. Loss/period | | |
|---|---|---|---|---|---|
| Material | Surface Area ($Cm^2$) | Sample Wt. (g) | 462 h | 905 h | 1367 h |
| $Si_3N_4$ (NC132/HP) | 4.50 | 26.52 | 0.03 | 0.00 | 0.03 |
| $Si_3N_4$ (NCX5301) | 1.87 | 2.80 | 0.10 | 0.02 | 0.10 |
| Fused Silica | 4.50 | 28.63 | 0.13 | 0.03 | 0.16 |

EXAMPLE 4

The stability of silicon carbide coated carbon fiber composites was evaluated for an extended period of time in a commercial reactor. The evaluation process was similar to that described in EXAMPLE 3, with the exception that the temperature to which the samples were exposed was about 1200° C. The samples tested were silicon carbide coated carbon fiber composite (CF222/P22) and non-coated carbon fiber composite (CF212), both as previously described in Example 1. The results are presented in Table 4.

TABLE 4

Stability of Silicon Carbide Coated Carbon Fiber Composite in a Hydrogen and Tetrachlorosilane Environment

| | | Initial | % Wt. Change/period | | |
|---|---|---|---|---|---|
| Material | Surface Area ($Cm^2$) | Sample Wt. (g) | 462 h | 905 h | 1367 h |
| CF222/P22 (Coated) | 9.49 | 32.08 | 0.10 | −0.58 | −0.45 |
| CF212 (Non-Coated) | 20.22 | 31.78 | 0.80 | −9.75 | −9.05 |

We claim:

1. A reactor comprising: a reaction vessel defining a chamber for contacting chlorosilane and hydrogen gases at temperatures greater than about 600° C., where the reaction vessel is formed from a silicon carbide coated carbon fiber composite.

2. A reactor according to claim 1, where the silicon carbide coated carbon fiber composite comprises a silicon carbide coating with a thickness within a range of about 0.02 mm to 0.13 mm; a matrix of carbon; and carbon fibers having a density within a range of about 1.5 to 2.0 g/cc, a Young's modulus within a range of about 200 to 600 GN/m², and tensile strength within a range of about 1500 to 8000 N/mm².

3. A reactor according to claim 2, where the carbon fiber composite has a density within a range of about 1.5 to 2.0 g/cc and the carbon fibers are 50 to 70 volume percent of the composite.

4. A reactor comprising: a reaction vessel defining a chamber for contacting chlorosilane and hydrogen gases at temperatures greater than about 600° C., where the reaction vessel is heated by heating element formed from a silicon carbide coated carbon fiber composite.

5. A reactor according to claim 4, where the silicon carbide coated carbon fiber composite comprises a silicon carbide coating with a thickness within a range of about 0.02 mm to 0.13 mm; a matrix of carbon; and carbon fibers having a density within a range of about 1.5 to 2.0 g/cc, a Young's modulus within a range of about 200 to 600 GN/m², and a tensile strength within a range of about 1500 to 8000 N/mm².

6. A reactor according to claim 5, where the carbon fiber composite has a density within a range of about 1.5 to 2.0 g/cc and the carbon fibers are 50 to 70 volume percent of the composite.

7. A reactor comprising: a reaction vessel defining a chamber for contacting chlorosilane and hydrogen gases at temperatures greater than about 600° C. and a heating element, wherein the reaction vessel and the heating element are formed from a silicon carbide coated carbon fiber composite.

8. A reactor according to claim 7, where the silicon carbide coated carbon fiber composite comprises a silicon carbide coating with a thickness within a range of about 0.02 mm to 0.13 mm; a matrix of carbon; and carbon fibers having a density within a range of about 1.5 to 2.0 g/cc, a Young's modulus within a range of about 200 to 600 GN/m², and a tensile strength within a range of about 1500 to 8000 N/mm².

9. A reactor according to claim 8, where the carbon fiber composite has a density within a range of about 1.5 to 2.0 g/cc and the carbon fibers are 50 to 70 volume percent of the composite.

10. A reactor comprising: a reaction vessel defining a chamber for contacting chlorosilane and hydrogen gases at temperatures greater than about 600° C., a heating element, and a silicon nitride insulator electrically insulating the heating element.

11. A reactor according to claim 10, where the silicon nitride insulator is formed from hot-pressed silicon nitride.

12. A reactor according to claim 10, where the heating element is formed from a silicon carbide coated carbon fiber composite.

13. A reactor according to claim 12, where the silicon carbide coated carbon fiber composite comprises a silicon carbide coating with a thickness within a range of about 0.02 mm to 0.13 mm; a matrix of carbon; and carbon fibers having a density within a range of about 1.5 to 2.0 g/cc, a Young's modulus within a range of about 200 to 600 GN/m², and a tensile strength within a range of about 1500 to 8000 N/mm².

14. A reactor according to claim 13, where the silicon nitride insulator is formed hot-pressed silicon nitride.

15. A reactor according to claim 12, where the carbon fiber composite has a density within a range of about 1.5 to 2.0 g/cc.

16. A reactor according to claim 12, where the silicon nitride insulator is formed from hot-pressed silicon nitride.

17. A reactor comprising: a reaction vessel defining a chamber for contacting chlorosilane and hydrogen gases at temperatures greater than about 600° C. and a heating element, where the reaction vessel and the heating element are formed from a silicon carbide coated carbon fiber composite, and the heating element is electrically insulated by a silicon nitride insulator.

18. A reactor according to claim 12, where the silicon carbide coated carbon fiber composite comprises a silicon carbide coating with a thickness within a range of about 0.02 mm to 0.13 mm; a matrix of carbon; and carbon fibers having a density within a range of about 1.5 to 2.0 g/cc, a Young's modulus within a range of about 200 to 600 GN/m², and a tensile strength within a range of about 1500 to 8000 N/mm².

19. A reactor according to claim 18, where the carbon fiber composite has a density within a range of about 1.5 to 2.0 g/cc and the carbon fibers are 50 to 70 volume percent of the composite.

20. A reactor according to claim 17, where the silicon nitride insulator is formed from hot-pressed silicon nitride.

21. A reactor according to claim 18, where the silicon nitride insulator is formed from hot-pressed silicon nitride.

* * * * *